United States Patent
Griot et al.

(10) Patent No.: US 11,234,155 B2
(45) Date of Patent: Jan. 25, 2022

(54) PROCESSING A DATA PACKET RECEIVED OVER CONTROL PLANE IN CONGESTION SCENARIO

(71) Applicant: QUALCOMM Incorporated, San Diego, CA (US)

(72) Inventors: Miguel Griot, La Jolla, CA (US); Haris Zisimopoulos, London (GB)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/926,564

(22) Filed: Jul. 10, 2020

(65) Prior Publication Data

US 2020/0344639 A1     Oct. 29, 2020

Related U.S. Application Data

(62) Division of application No. 15/702,429, filed on Sep. 12, 2017, now Pat. No. 10,750,400.
(Continued)

(51) Int. Cl.
*H04W 28/02* (2009.01)
*H04W 28/06* (2009.01)

(52) U.S. Cl.
CPC ... *H04W 28/0273* (2013.01); *H04W 28/0247* (2013.01); *H04W 28/0231* (2013.01); *H04W 28/0289* (2013.01); *H04W 28/06* (2013.01)

(58) Field of Classification Search
CPC ......... H04W 28/0273; H04W 28/0247; H04W 28/0231; H04W 28/0289; H04W 28/06
See application file for complete search history.

(56) References Cited

U.S. PATENT DOCUMENTS 9,872,330 B2   1/2018   Zhang et al.
10,257,813 B2  4/2019   Shi et al.
(Continued)

FOREIGN PATENT DOCUMENTS

CA    2868364 A1      9/2013
KR    101479895 B1    1/2015
(Continued)

OTHER PUBLICATIONS

International Search Report and Written Opinion—PCT/US2017/051344—ISA/EPO—dated Nov. 27, 2017.
(Continued)

*Primary Examiner* — Christopher M Crutchfield
*Assistant Examiner* — Tito Q Pham
(74) *Attorney, Agent, or Firm* — Shankar Krithivasan

(57) ABSTRACT

Certain aspects of the present disclosure relate to methods and apparatus for communicating data between a user-equipment and network entity. For example, certain aspects of the present disclosure provide a method for wireless communication. The method generally includes receiving a message comprising a data packet from a user equipment (UE) during a communication session, and detecting whether the data packet is the last data packet for transmission or reception by the UE during the communication session. In certain aspects, the method also includes determining whether to process or discard the data packet based on the detection and whether a backoff timer is to be sent to the UE, and processing or discarding the data packet based on the determination.

14 Claims, 10 Drawing Sheets

Related U.S. Application Data

(60) Provisional application No. 62/402,289, filed on Sep. 30, 2016.

(56) References Cited

U.S. PATENT DOCUMENTS

| | | | |
|---|---|---|---|
| 10,750,400 B2 | 8/2020 | Griot et al. | |
| 2004/0003069 A1 | 1/2004 | Wong | |
| 2006/0234740 A1* | 10/2006 | Sakoda | H04W 72/0446 455/507 |
| 2008/0320155 A1 | 12/2008 | Ganapathy et al. | |
| 2009/0059917 A1 | 3/2009 | Lussier et al. | |
| 2012/0082029 A1 | 4/2012 | Liao | |
| 2012/0106327 A1 | 5/2012 | Lin et al. | |
| 2012/0182917 A1* | 7/2012 | Edlund | A61N 1/37276 370/311 |
| 2012/0275401 A1* | 11/2012 | Sun | H04W 72/042 370/329 |
| 2012/0294144 A1* | 11/2012 | Niemi | H04W 36/0022 370/230 |
| 2013/0016607 A1* | 1/2013 | Tiwari | H04W 60/06 370/230 |
| 2013/0094371 A1 | 4/2013 | Vallath et al. | |
| 2013/0148574 A1* | 6/2013 | Liu | H04W 52/0222 370/328 |
| 2013/0258967 A1* | 10/2013 | Watfa | H04W 76/10 370/329 |
| 2014/0031069 A1* | 1/2014 | Yang | H04W 68/00 455/458 |
| 2015/0003228 A1* | 1/2015 | Choi | H04W 76/19 370/216 |
| 2015/0181462 A1* | 6/2015 | Iwai | H04W 28/16 370/229 |
| 2015/0381505 A1 | 12/2015 | Sundararaman et al. | |
| 2017/0374613 A1* | 12/2017 | Ianev | H04W 8/065 |
| 2018/0027479 A1 | 1/2018 | Ahmad et al. | |
| 2020/0305022 A1* | 9/2020 | Ianev | H04W 28/0247 |

FOREIGN PATENT DOCUMENTS

| | | |
|---|---|---|
| WO | 2014013661 A1 | 1/2014 |
| WO | 2014055210 A1 | 4/2014 |
| WO | 2015100683 A1 | 7/2015 |

OTHER PUBLICATIONS

NTT DOCOMO: "Key Issue on Group-Specific NAS Level Congestion Control", SA WG2 Meeting #104, 3GPP Draft; S2-142377_DCM_GROUPE_GROUP-SPECIFIC NAS Level Congestion Control, 3rd Generation Partnership Project (3GPP), Mobile Competence Centre, 650, Route Des Lucioles, F-06921 Sophia-Antipolis Cedex, France, vol. SA WG2, No. Dublin, Ireland; Jul. 2, 2014, 2 Pages, XP050836816, Jul. 7, 2014-Jul. 11, 2014, Retrieved from the Internet: URL: http://www.3gpp.org/ftp/tsg_sa/WG2_Arch/TSGS2_104_Dublin/Docs/[retrieved on Jul. 2, 2014].

Qualcomm Incorporated, et al., "Use of MM Backoff Timer for Voice Centric Devices", SA WG2 Meeting #97, 3GPP Draft; S2-132297 (Revision of S2-132250/2096/1915), 23401-C00 Backoff Timer for Voice Centric, 3rd Generation Partnership Project (3GPP), Mobile Competence Centre, 650, Route Des Lucioles, F-06921 Sophia-Antipolis Cedex, France, vol. SA WG2, No. Busan, South Korea; May 31, 2013, 3 Pages, May 27, 2013-May 31, 2013, XP050709433.

Samsung, et al., "Solution Update for KI#7", 3GPP TSG-SA WG2 Meeting #116bis, S2-165232, Sanya, P.R. China, 20160829-20160902, 5 Pages, Sep. 2, 2016, Internet URL: http://www.3gpp.org/ftp/tsg_sa/WG2_Arch/TSGS2_116BIS_Sanya/Docs/S2-165232.zip.

VODAFONE: "Release Assistance Information for Pair of Packets", 3GPP TSG-SA WG2 Meeting #116, S2-163827, Vienna, Austria, Jul. 11, 2016-Jul. 15, 2016, 4 Pages, Jul. 15, 2016, Internet URL: http://www.3gpp.org/ftp/tsg_sa/WG2_Arch/TSGS2_116_Vienna/Docs/S2-163827.zip.

* cited by examiner

PROCESSING A DATA PACKET RECEIVED OVER CONTROL PLANE IN CONGESTION SCENARIO

CROSS-REFERENCE TO RELATED APPLICATIONS

This application is a divisional application of U.S. application Ser. No. 15/702,429, filed Sep. 12, 2017, which claims benefit of priority to Provisional Application No. 62/402,289, filed Sep. 30, 2016, which is expressly incorporated herein by reference in its entirety.

BACKGROUND

Field of the Disclosure

The present disclosure relates generally to wireless communication, and more particularly, to methods and apparatus for communicating data packets.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). However, as the demand for mobile broadband access continues to increase, there exists a need for further improvements in LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

The present disclosure relates generally to wireless communication, and more particularly, to communication of data packets between a user equipment (UE) and a network node.

Certain aspects of the present disclosure provide a method for wireless communication by a network node. The method generally includes receiving a message comprising a data packet from a UE during a communication session, detecting whether the data packet is the last data packet for transmission or reception by the UE during the communication session, determining whether to process or discard the data packet based on the detection and whether a backoff timer is to be sent to the UE, and processing or discarding the data packet based on the determination.

Certain aspects of the present disclosure provide a method for wireless communications by a UE. The method generally includes transmitting a data packet to a network node during a communication session, and receiving a message including an indication of a back-off timer from the network node in response to the data packet. In certain aspects, the method also includes determining whether the data packet was processed by the network node based on whether the message comprises an accept message or a reject message, and indicating to an upper layer of the UE whether the data packet was processed based on the determination.

Certain aspects of the present disclosure provide an apparatus for wireless communication by a network node. The apparatus generally includes means for receiving a message comprising a data packet from a UE during a communication session, and means for detecting whether the data packet is the last data packet for transmission or reception by the UE during the communication session. In certain aspects, apparatus also includes means for determining whether to process or discard the data packet based on the detection and whether a backoff timer is to be sent to the UE, and means for processing or discarding the data packet based on the determination.

Certain aspects of the present disclosure provide an apparatus for wireless communication by a UE. The apparatus generally includes means for transmitting a data packet to a network node during a communication session, and means for receiving a message including an indication of a back-off timer from the network node in response to the data packet. In certain aspects, the apparatus may also include means for determining whether the data packet was processed by the network node based on whether the message comprises an accept message or a reject message, and means for indicating to an upper layer of the UE whether the data packet was processed based on the determination.

Certain aspects of the present disclosure provide a computer-readable medium having instructions stored thereon to cause a network node to receive a message comprising a data packet from a UE during a communication session, detect whether the data packet is the last data packet for transmission or reception by the UE during the communication session, determine whether to process or discard the data packet based on the detection and whether a backoff timer is to be sent to the UE, and process or discard the data packet based on the determination.

Certain aspects of the present disclosure provide a computer-readable medium having instructions stored thereon to cause a UE to transmit a data packet to a network node during a communication session, and receive a message including an indication of a back-off timer from the network node in response to the data packet. In certain aspects, the instructions cause the UE to determine whether the data packet was processed by the network node based on whether the message comprises an accept message or a reject message, and indicate to an upper layer of the UE whether the data packet was processed based on the determination.

Certain aspects of the present disclosure provide an apparatus for wireless communication by a network node. The apparatus generally includes a receiver configured to receive a message comprising a data packet from a UE during a communication session. The apparatus may also include a processing system configured to detect whether the data packet is the last data packet for transmission or reception by the UE during the communication session, determine whether to process or discard the data packet based on the detection and whether a backoff timer is to be sent to the UE, and process or discard the data packet based on the determination.

Certain aspects of the present disclosure provide an apparatus method for wireless communications by a UE. The apparatus generally includes a transmitter configured to transmit a data packet to a network node during a communication session, and a receiver configured to receive a message including an indication of a back-off timer from the network node in response to the data packet. In certain aspects, the apparatus also includes a processing system configured to determine whether the data packet was processed by the network node based on whether the message comprises an accept message or a reject message, and indicate to an upper layer of the UE whether the data packet was processed based on the determination.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
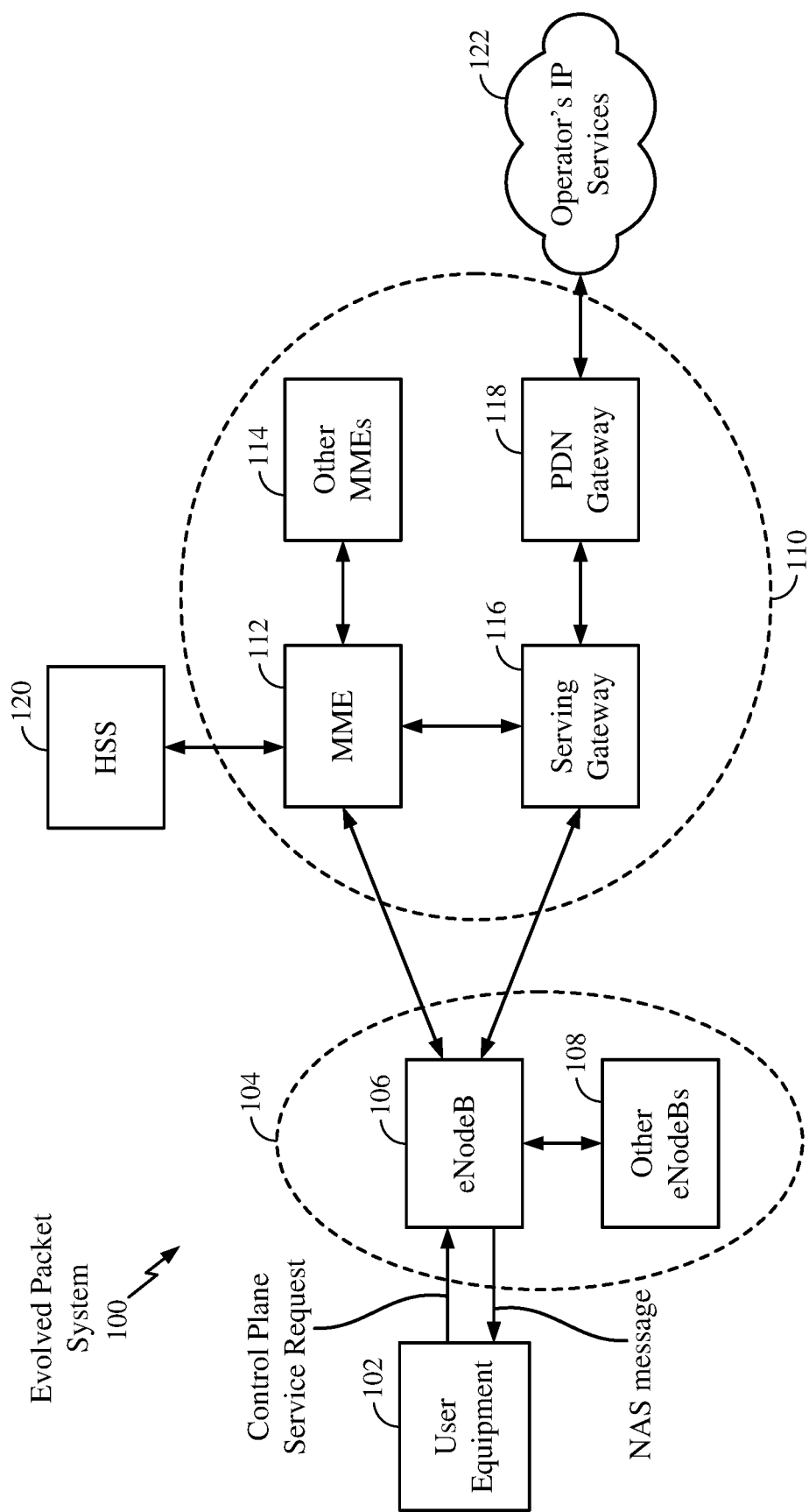
FIG. 1 is a diagram illustrating an example of a network architecture.

Certain aspects of the present disclosure provide techniques for handling data communication to a network while the network is overloaded. For example, in certain aspects, an MME may be configured to determine whether to process or discard a data packet received from the UE based on whether the processing of the data packet would result in further downlink and/or uplink communications. If further communications are to be expected and the MME has determined that the network is overloaded, the MME may discard the data packet, in effect avoiding further downlink and/or uplink communications.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. LTE, LTE-Advanced, and other releases of LTE are collectively referred to as LTE. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). These communications networks are merely listed as examples of networks in which the techniques described in this disclosure may be applied; however, this disclosure is not limited to the above-described communications network.

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn attention, especially in the uplink (UL) communications where lower PAPR greatly benefits the wireless node in terms of transmit power efficiency.

Aspects of the present disclosure provide methods and apparatus for an uplink/downlink transmission design.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some implementations, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart/virtual reality glasses/googles, smart/virtual reality helmets/headsets, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a positioning/navigation device (e.g., GPS, Beidou, Glonass, Galileo, terrestrial based, etc.), or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices, that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later.

Example Wireless Communications System

FIG. 1 is a diagram illustrating a network architecture 100 in which aspects of the present disclosure may be practiced. For example, UE 102 may receive an uplink grant from an eNB 106 or 108 indicating one or more tones within a resource block (RB) allocated to the UE for narrowband communication. The UE 102 may then transmit using the one or more tones indicated in the uplink grant.

The network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The network architecture 100 includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, a drone, a robot, a sensor, a monitor, a meter, a camera/security camera, a gaming device, a wearable device (e.g., smart watch, smart glasses, smart ring, smart bracelet, smart wrist band, smart jewelry, smart clothing, etc.), any other similar functioning device, etc. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the network.

In certain aspects, the UE 102 may initiate a control plane service request in order to send data to the network. In some cases, the MME 112 may determine that the network is overloaded and may decide to return a data back-off timer to the UE 102 via a non-access stratum (NAS) message. For example, the UE 102 may indicate to the MME 112, via the eNB 106, that no further UL or DL data transmissions are expected. In this case, the MME 112 may process (integrity check/decipher/forward) the received data packet, and send a service accept message to the UE 102 with a back-off timer. The UE 102 may interpret the service accept message as a successful transmission of the data packet, and start the back-off timer.

In certain aspects, the UE 102 may indicate to the MME 112 that further data transmission is expected, and thus, the MME 112 may not process the received control plane data packet and may send a service reject message to the UE 102 with a back-off timer. In this case, the UE 102 may interpret the service reject message as an indication that the data packet transmission was unsuccessful.

Figure 2:
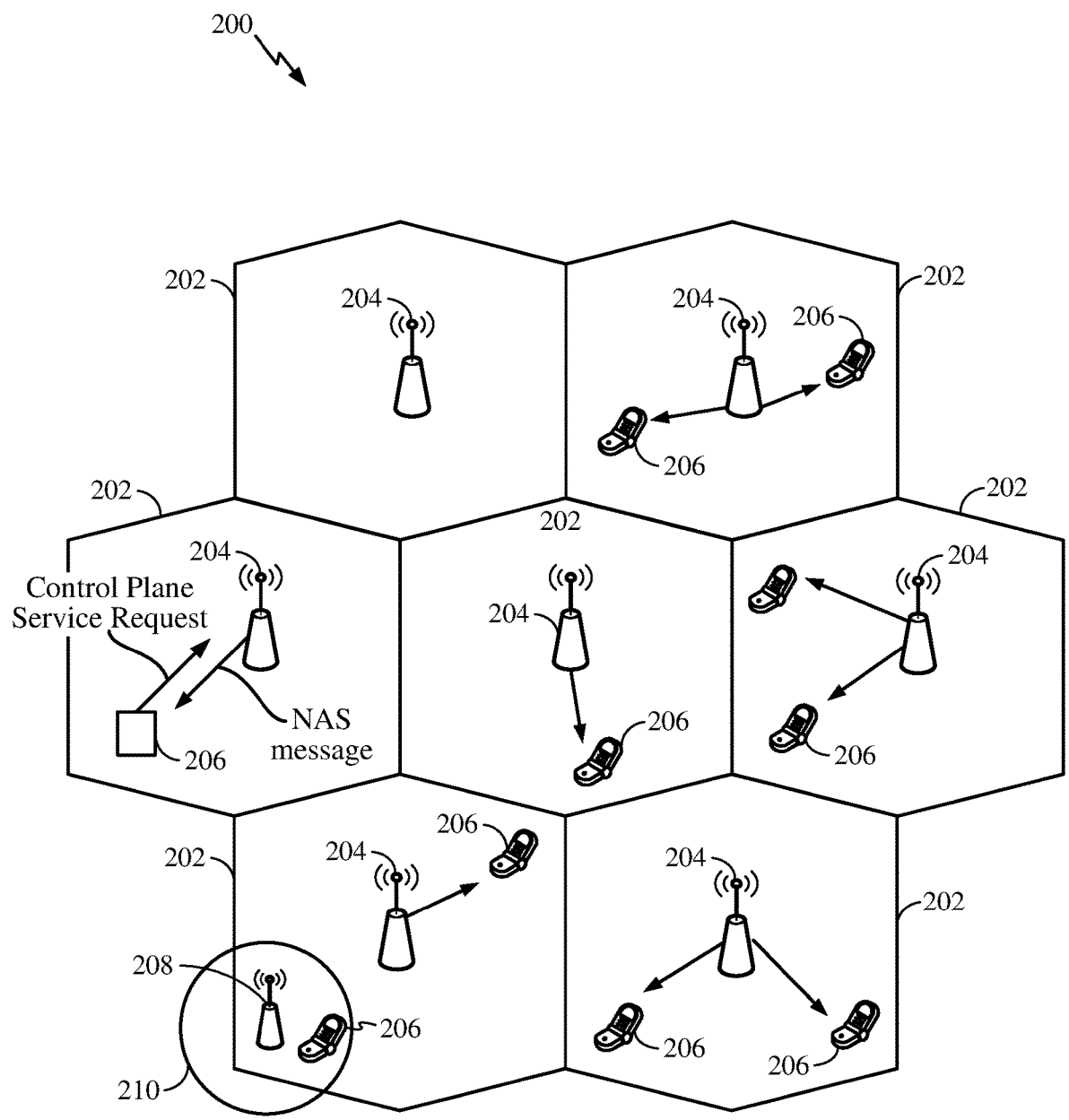
FIG. 2 is a diagram illustrating an example of an access network.

FIG. 2 is a diagram illustrating an example of an access network 200 in in which aspects of the present disclosure may be practiced. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

The modulation and multiple access scheme employed by the access network 200 may vary depending on the particular telecommunications standard being deployed. In some applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for certain applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network may be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

In certain aspects, the UE 206 sends a control plane service request message from idle mode in order to transmit data to the eNB 204. In some cases, a MME (e.g., the MME 112 of FIG. 1) may determine that the network is overloaded and may decide to return a data back-off timer to the UE 206. The UE 206 may indicate to the MME, via the eNB 204, that no further UL or DL data transmissions are expected. In this case, the MME may process (integrity check/decipher/forward) the received data packet, and send a NAS message having a service accept to the UE 206 with a back-off timer. The UE 206 may interpret the service accept message as a successful transmission of the data packet, and start the back-off timer.

In certain aspects, the UE 206 may indicate to the MME that further data transmission are expected, and thus, the MME may not process the received control plane data packet and may send the NAS message with a service reject and a back-off timer. In this case, the UE may interpret the service reject message as an indication that the data packet transmission was unsuccessful.

Figure 3:
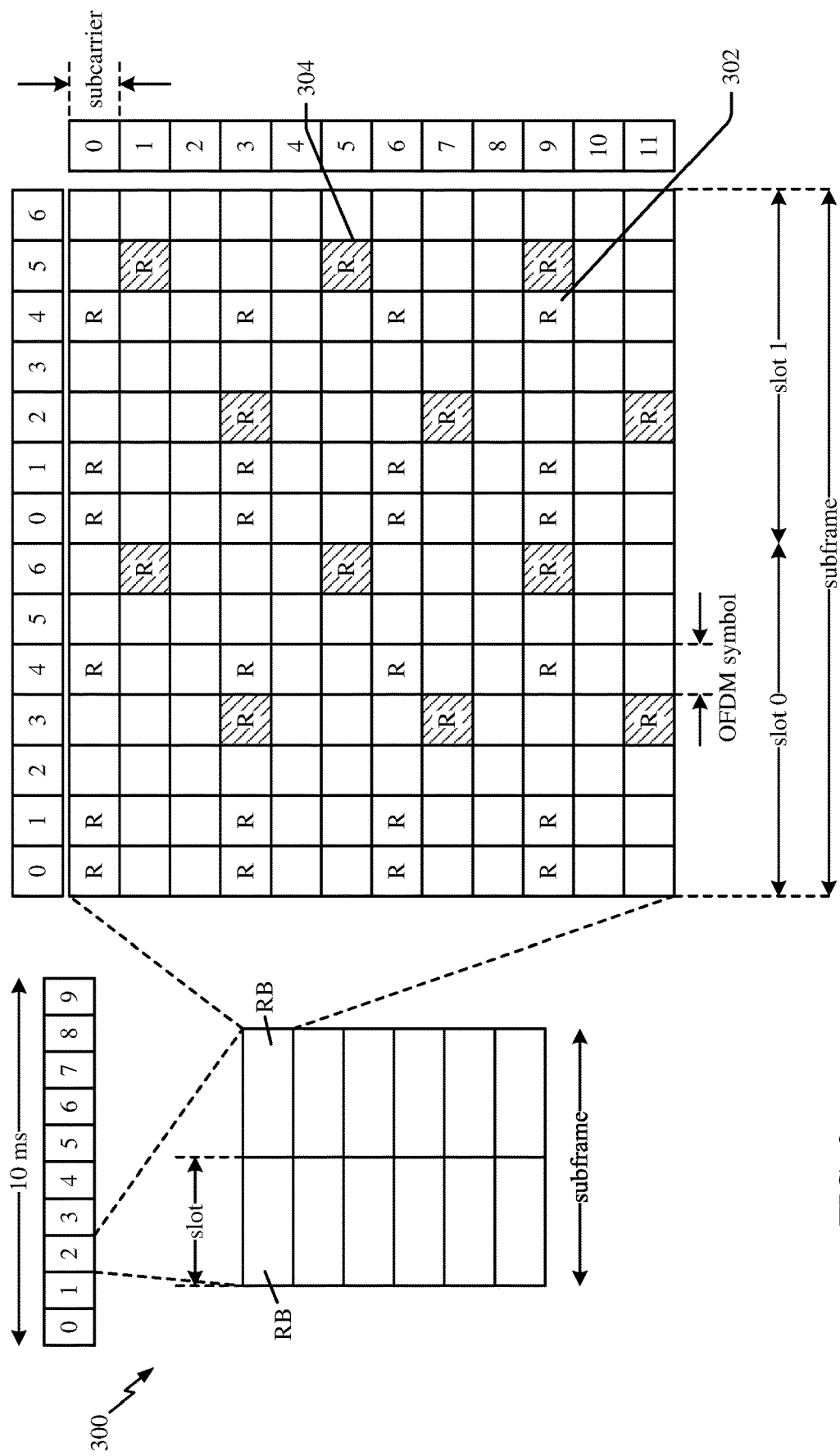
FIG. 3 is a diagram illustrating an example of a DL frame structure in LTE.

FIG. 3 is a diagram 300 illustrating an example of a DL frame structure. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In some cases, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In some cases, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
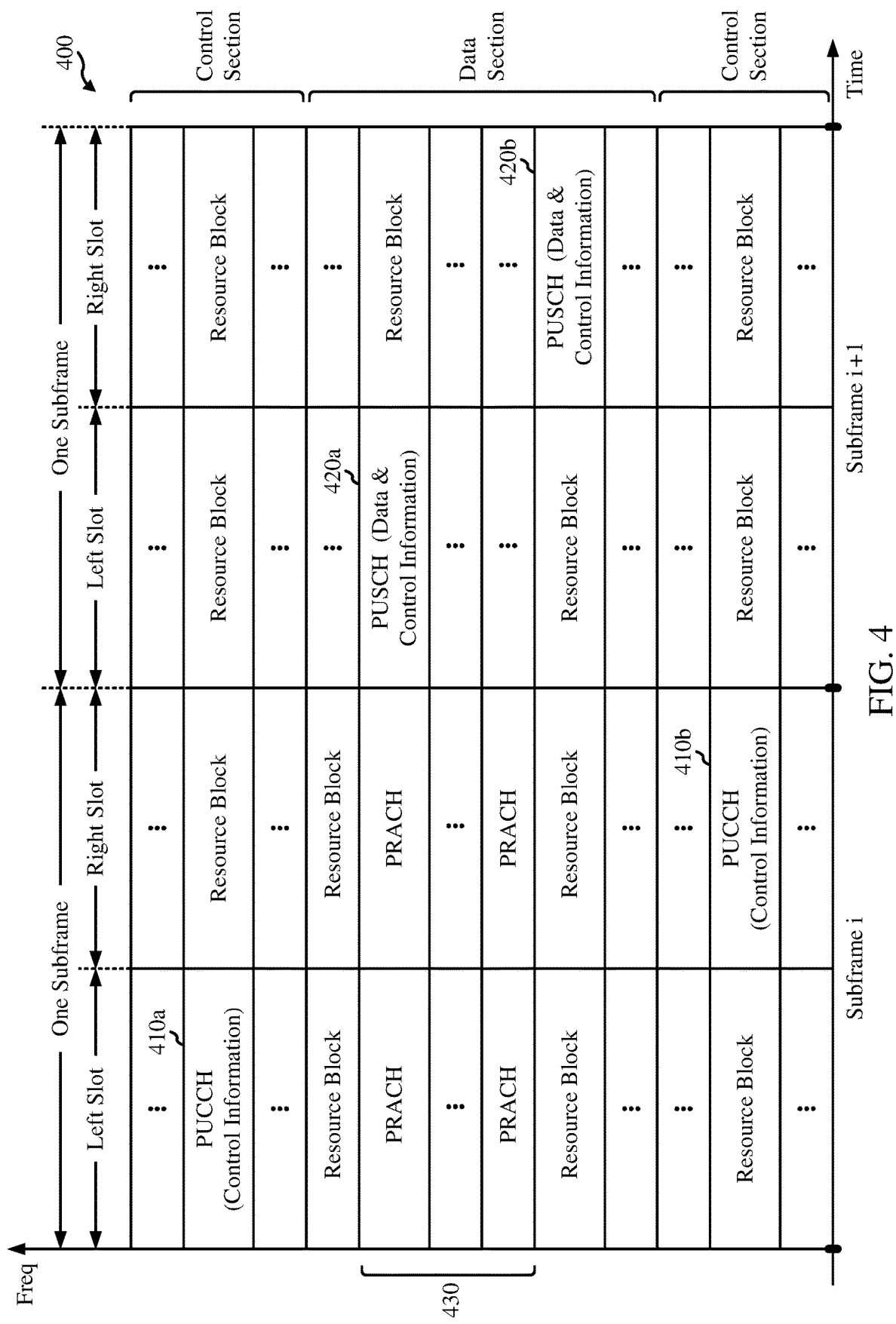
FIG. 4 is a diagram illustrating an example of an UL frame structure in LTE.

FIG. 4 is a diagram 400 illustrating an example of an UL frame structure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
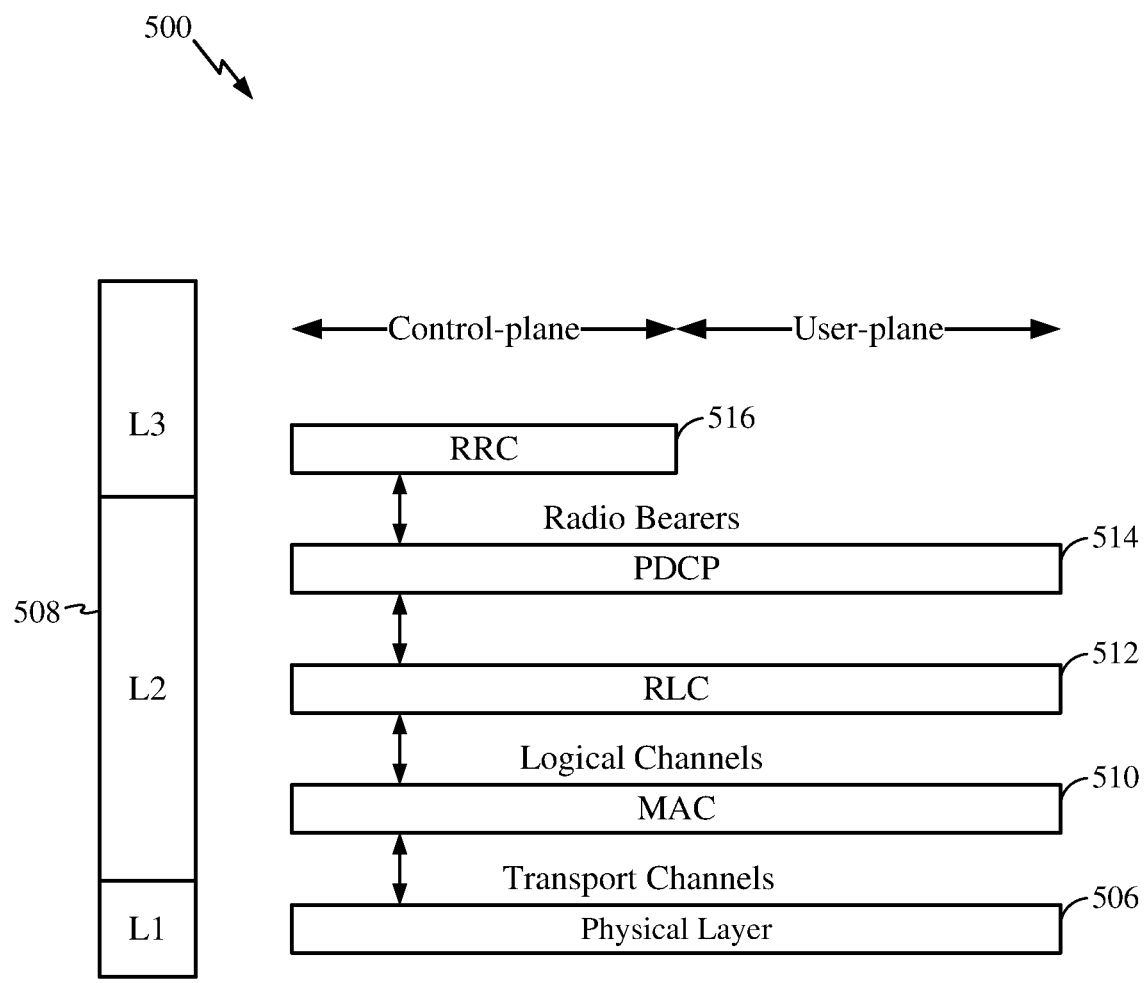
FIG. 5 is a diagram illustrating an example of a radio protocol architecture for the user and control plane.

FIG. 5 is a diagram 500 illustrating an example of a radio protocol architecture for the user and control planes. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
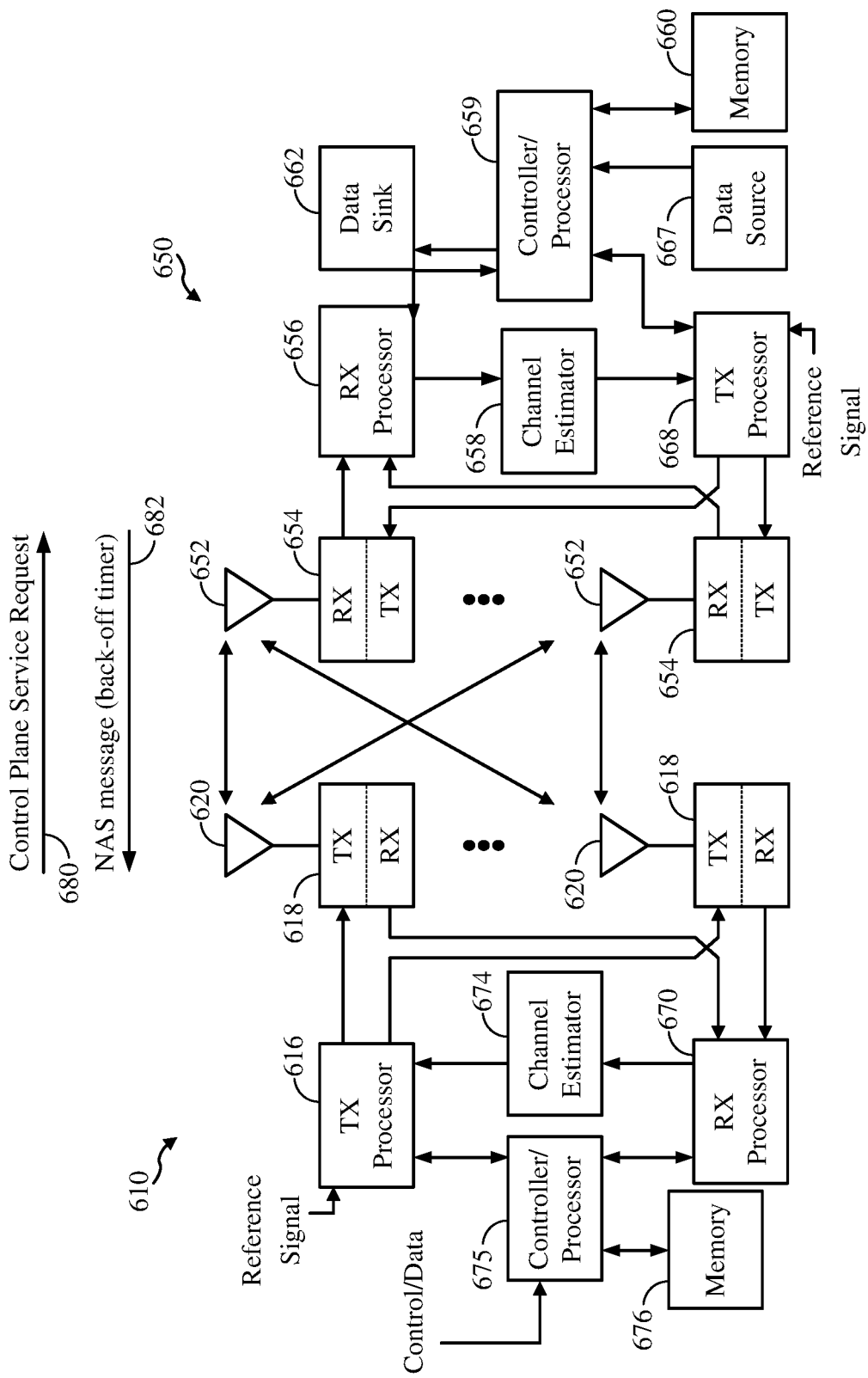
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network, in which aspects of the present disclosure may be practiced. In certain aspects, the UE 650 may correspond to the UE 102 of FIG. 1 and the eNB 610 may correspond to the eNB 106 of FIG. 1. In certain aspects, a UE (e.g., UE 650) combines pairs of antenna ports to generate at least first and second combined antenna ports. For each combined port, the UE adds reference signals received on Resource Elements (REs) of each of the combined pair of antenna ports. The UE then determines channel estimates for each combined antenna port based on the added reference signals for the combined port. In certain aspects, for each of the combined ports, the UE processes data received on data REs in pairs, based on the determined channel estimates of the combined port.

In certain aspects, a Base Station (BS) (e.g., eNB 610) combines pairs of antenna ports to generate the at least first and second combined antenna ports, for transmission in a narrow band region of a larger system bandwidth. For each of the first and the second combined antenna ports, the BS transmits same data on corresponding REs of each of the combined pairs of antenna ports, wherein a receiving UE determines channel estimates for each of the first and second combined ports, and processes the data received in the REs in pairs based on the determined channel estimates.

It may be noted that the UE 650 may be implemented by a combination of one or more of the controller 659, the RX processor 656, the channel estimator 658 and/or transceiver 654 at the UE 650, for example. Further, the BS may be implemented by a combination of one or more of the controller 675, the TX processor and/or the transceiver 618 at the eNB 610.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operations at the eNB 610 and the UE 650, respectively.

Figure 8:
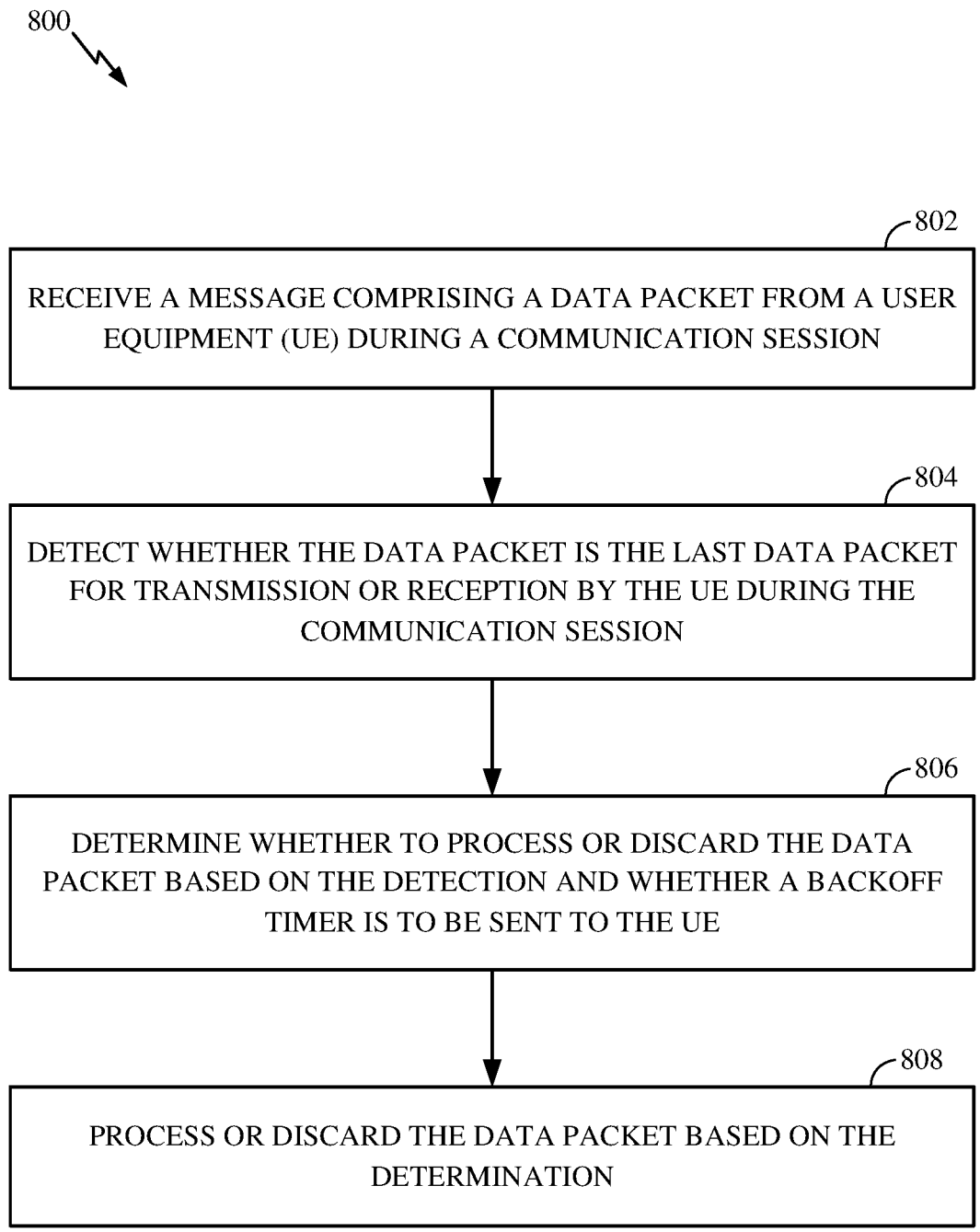
FIG. 8 illustrates example operations for wireless communication by a network node, in accordance with certain aspects of the present disclosure.

The controller/processor 659 and/or other processors, components and/or modules at the UE 650 may perform or direct operations, for example, operations 800 in FIG. 8, and/or other processes for the techniques described herein for implementing the new transmission scheme. Further, the controller/processor 675 and/or other processors, components and/or modules at the eNB 610 may perform or direct operations, for example, operations 900 in FIG. 9, and/or other processes for the techniques described herein for implementing the new transmission scheme. In certain aspects, one or more of any of the components shown in FIG. 6 may be employed to perform example operations 800 and 900, and/or other processes for the techniques described herein. The memories 660 and 676 may store data and program codes for the UE 650 and eNB 610 respectively, accessible and executable by one or more other components (e.g., the controllers/processors 675, 659) of the UE 650 and the eNB 610.

In certain aspects, the UE 650 send a control plane service request message 680 from idle mode in order to transmit data to the eNB 610. In some cases, a MME (e.g., the MME 112 of FIG. 1) may determine that the network is overloaded and may decide to return a data back-off timer to the UE 650. In certain aspects, the UE 650 may indicate to the MME, via the eNB 610, that no further UL or DL data transmissions are expected. In this case, the MME may process (integrity check/decipher/forward) the received data packet, and send a NAS message 682 having a service accept to the UE 650 with a back-off timer. The UE 650 may interpret the service accept message as a successful transmission of the data packet, and start the back-off timer.

In certain aspects, the UE 650 may indicate to the MME that further data transmission are expected, and thus, the MME may not process the received control plane data packet and may send the NAS message 682 with a service reject and a back-off timer. In this case, the UE may interpret the service reject message as an indication that the data packet transmission was unsuccessful.

Internet-of-Things

The Internet-of-Things (IoT) is a network of physical objects or "things" embedded with, for example, electronics, software, sensors, and network connectivity (e.g., wireless, wireline, positioning, etc.), which enable these objects to collect and exchange data. IoT allows objects to be sensed and controlled remotely across existing network infrastructure, creating opportunities for more direct integration between the physical world and computer-based systems, and resulting in improved efficiency, accuracy and economic benefit. When IoT is augmented with sensors and actuators, the technology becomes an instance of the more general class of cyber-physical systems, which also encompasses technologies such as smart grids, smart homes, intelligent transportation and smart cities. Each "thing" is generally uniquely identifiable through its embedded computing system but is able to interoperate within the existing Internet infrastructure.

Example Techniques for Processing a Data Packet Received Over Control Plane in Congestion Scenario In the context of internet of things (IOT), downlink (DL)/uplink (UL) of data packets may be communicated via control plane (CP) signaling (e.g., data over non-access stratum (NAS) between a UE and MME). In certain aspects, the MME (e.g., MME 112 of FIG. 1) may identify that it is in a congestion scenario. For example, the MME may determine that the network used for communication is congested. The MME may also receive an UL data packet over control plane signaling from the UE. Due to the congestion scenario, the MME may decide to either process or discard the data packet from the UE. In some cases, the UE may further provide information with regards to whether further messages (downlink (DL) or uplink (UL)) or data packets are expected from this communication. The MME may decide to process a received message (packet) since it already received it. However, if the message is likely to trigger more messages, e.g. an ACK from the application server, then the MME may decide to discard the message.

In some cases, a back-off timer may be provided by the MME to the UE. The back-off timer may indicate a time period during which the UE may defer data transmissions to the MME. In some cases, the UE may send a service request message with EPS session management (ESM) data transport with the data packet. Then, the overloaded MME may send a service accept with a data back-off timer. However, it may be unclear to the UE whether the MME has processed the received data packet and forwarded it to the correct core network (CN) node (i.e. the Service Capability Exposure Function (SCEF) or SGW).

In certain aspects, if the MME sends a service accept to the UE, the UE may assume that the MME has correctly processed and forwarded the data packet (e.g. CP data packet) sent by the UE. However, this may create issues for the case that a UL data packet sent by the UE would trigger a message response (e.g. an ACK) from the application server or triggers a stream of further message exchanges. Since the MME's intention is to stop data transport for the UE, in the case when further message exchanges may be possible for the UE, it may be better for the MME to reject the service request and drop any data packets contained in it. In that case, the MME can send a service reject message including a data back-off timer to the UE. The UE may interpret this indication as an unsuccessful transmission of the data packet. The unsuccessful transmission of the data may be indicated to upper layers (e.g., application layer) of the UE.

In certain aspects of the present disclosure, the UE may indicate to the MME, in a release assistance information (RAI) in a NAS protocol data unit (PDU), that no further UL or DL data transmissions are expected. In that case, since the MME already received the data packet and determines that no further packets are expected based on the indication from the UE, the MME may process and forward the data packet to the CN, in which case the MME may send a service accept with a data back-off timer. In certain aspects of the present disclosure, if the MME sends a service accept with a data back-off timer during the service request procedure, the MME also processes and forwards the data packet received in the service request message.

Figure 7:
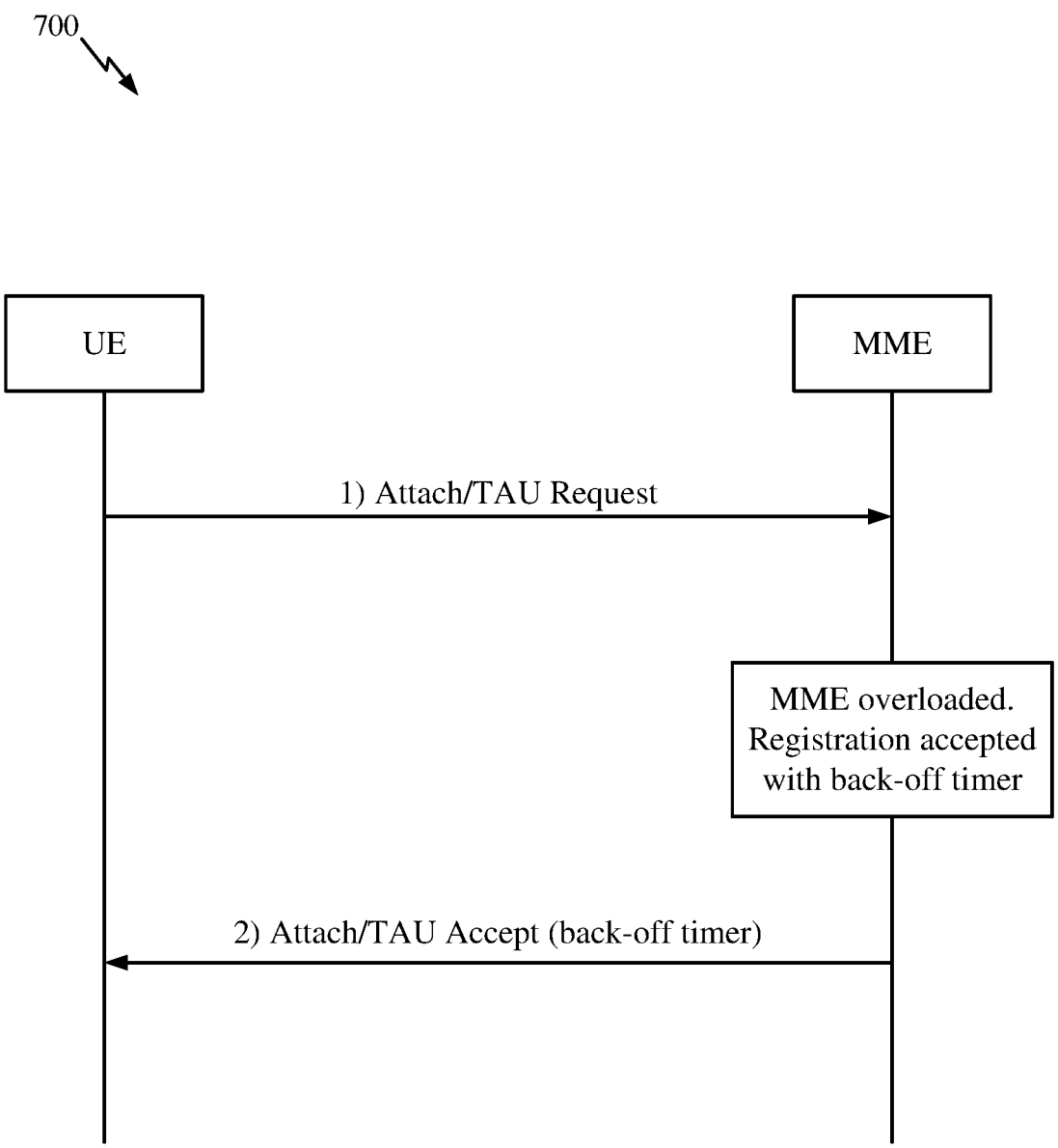
FIG. 7 illustrates example operations for communicating control plane data back-off timer at registration, in accordance with certain aspects of the present disclosure.

FIG. 7 illustrates example operations 700 for communicating control plane data back-off timer at registration, in accordance with certain aspects of the present disclosure. For example, at step 1, the UE may send an attach or tracking area update (TAU) request to the MME. The preferred network behavior may be control plane cellular IoT (CIoT) optimization. The MME may then determine whether a back-off timer is to be sent to the UE. For example, the MME may determine that the network is overloaded and a back-off timer should be sent to the UE. At step 2, if the MME is overloaded or close to overload (based on operator set threshold or policy) with data transfer via the control plane, it may accept the registration request (e.g., the attach/TAU request) from the UE, but may return a control plane data back-off timer via the attach/TAU accept message, indicating a time for which the UE should defer data transmissions. At this point, the UE may start the back-off timer.

FIG. 8 illustrates example operations 800 for wireless communication, in accordance with certain aspects of the present disclosure. The operation 800 may be performed, for example, by an MME, such as the MME 112 of FIG. 1.

The operations 800, begin at block 802, by receiving a message comprising a data packet from a user equipment (UE) during a communication session. At block 804, the MME may detect whether the data packet is the last data packet for transmission or reception by the UE during the communication session. For example, in some cases, the MME may receive an indication from the UE indicating whether the data packet is the last data packet. In other cases, the UE may not send the indication of whether the data packet is the last data packet, and the lack of indication from the UE may indicate to the MME that the data packet is the last data packet. In otherwords, the UE may only provide an indication, to the MME, of whether the data packet is the last data packet during the communication session.

At block 806, the operations 800 continue by the MME determining whether to process or discard the data packet based on the detection and whether a backoff timer is to be sent to the UE. For example, the MME may detect whether a network used to receive the data packet is overloaded. At block 808, the MME may process or discard the data packet based on the determination at block 806. For example, the MME may discard the data packet if it is determined that the data packet is not the last data packet, or process the data packet otherwise.

In some cases, the MME may receive a service request (e.g., CP service request) with the data packet (e.g., a CP data packet). As described above, the MME may determine to send an indication of a data back-off timer to the UE. If the UE indicates (e.g., in a release assistance information (RAI) in the NAS protocol data unit (PDU)) that no further UL or DL data transmissions are expected (e.g., that the data packet is the last data packet for transmission or reception), then the MME may process (integrity check/decipher/forward to another network node) the received data packet, and send service accept message to the UE with the data back-off timer. In this case, the UE may interpret reception of the service accept message as a successful transmission of the data packet (e.g., that the MME processed the data packet). For other cases, (e.g. no RAI or RAI with further DL expected), the MME may not process the data packet and send a service reject message to the UE with data back-off timer. The UE may interpret the service reject message as an unsuccessful transmission of the data packet.

Figure 9:
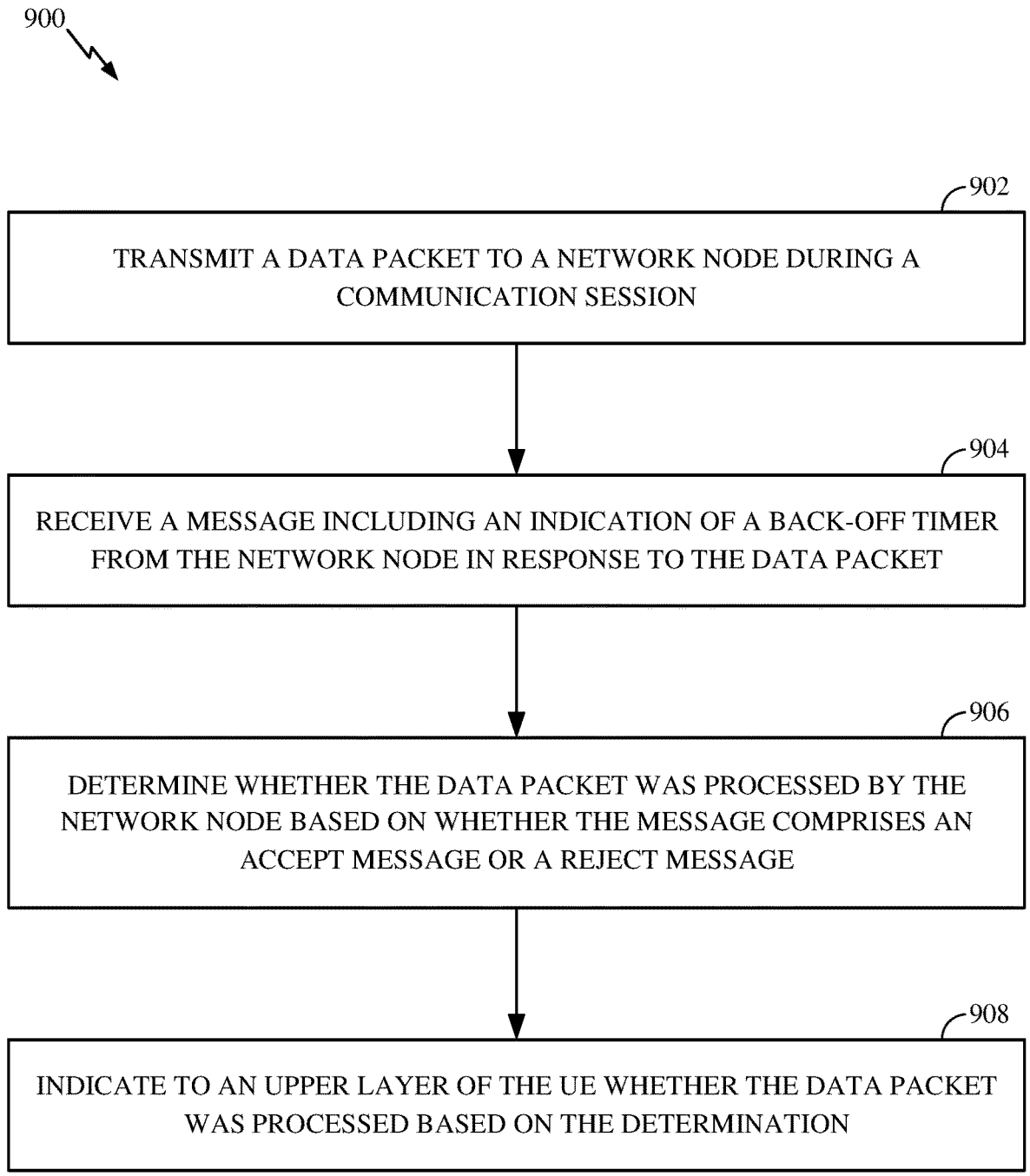
FIG. 9 illustrates example operations for wireless communication by a user-equipment (UE), in accordance with certain aspects of the present disclosure.

FIG. 9 illustrates example operations 900 for wireless communication, in accordance with certain aspects of the present disclosure. The operation 900 may be performed, for example, by a UE, such as the UE 102 of FIG. 1.

The operations 900, begin at block 902, by transmitting a data packet to a network node (e.g., MME 112) during a communication session. At block 904, the UE may receive a message including an indication of a back-off timer from the network node in response to the data packet. At block 906, the UE may determine whether the data packet was processed by the network node based on whether the message comprises an accept message or a reject message. At block 908, the UE may indicate to an upper layer (e.g., the application layer) of the UE whether the data packet was processed based on the determination.

In certain aspects, the UE may move the communication session to a user plane of the UE based on the message. For example, the UE may perform NAS procedure to request the network node (e.g., MME 112) to enable data communication over data radio bearers (DRBs), i.e., user plane. This can be done by performing a registration update (e.g., TAU) with data pending indication or regular service request procedure to enable DRBs. The registration update triggers the MME to request the radio access node (e.g., eNB) to establish DRBs for all PDN connections allowed to be served over DRBs, including the PDN connections where data communication was previously served over CP path. The MME also establishes S 1-U tunneling between SGW and the eNB for user plane data transport. Once the DRBs for the PDN connections are established between the UE and the radio access node, the UE starts data communication over the user plane, i.e. over DRBs plus S 1-U.

As presented above, the UE may receive a back-off timer from the network node. In certain aspects of the present disclosure, if the UE receives a data packet (e.g., mobile terminated (MT) CP data packet) while the data back-off timer is running, the UE may stop the back-off timer and continue with data transmissions. For example, the MME may send a data back-off timer to the UE while overloaded, however, the MME may stop being overloaded before back-off timer expires. Thus, the MME may receive an MT data for the UE, and since the MME is not overloaded anymore, the MME may proceed with delivering data packet to the UE. In this case, the UE can take the receipt of the data packet as an indication that the MME is not overloaded, and thus, stop the back off timer.

If the UE is prevented from sending any data during a back-off timer, several issues may arise. In some cases, the application server, when sending an MT data packet, would be expecting a response message from the UE (e.g. an ACK). However, if the UE is not allowed to transmit the ACK, then the message transaction may fail at the application layer. Moreover, if the MME is no longer congested, then there may be no reason to prevent the UE from sending mobile originated (MO) data (even data other than the ACK for the MT data). In certain aspects of the present disclosure, when the UE receives MT data from the MME, while the data back-off timer is running, then the UE may stop the back-off timer.

Figure 10:
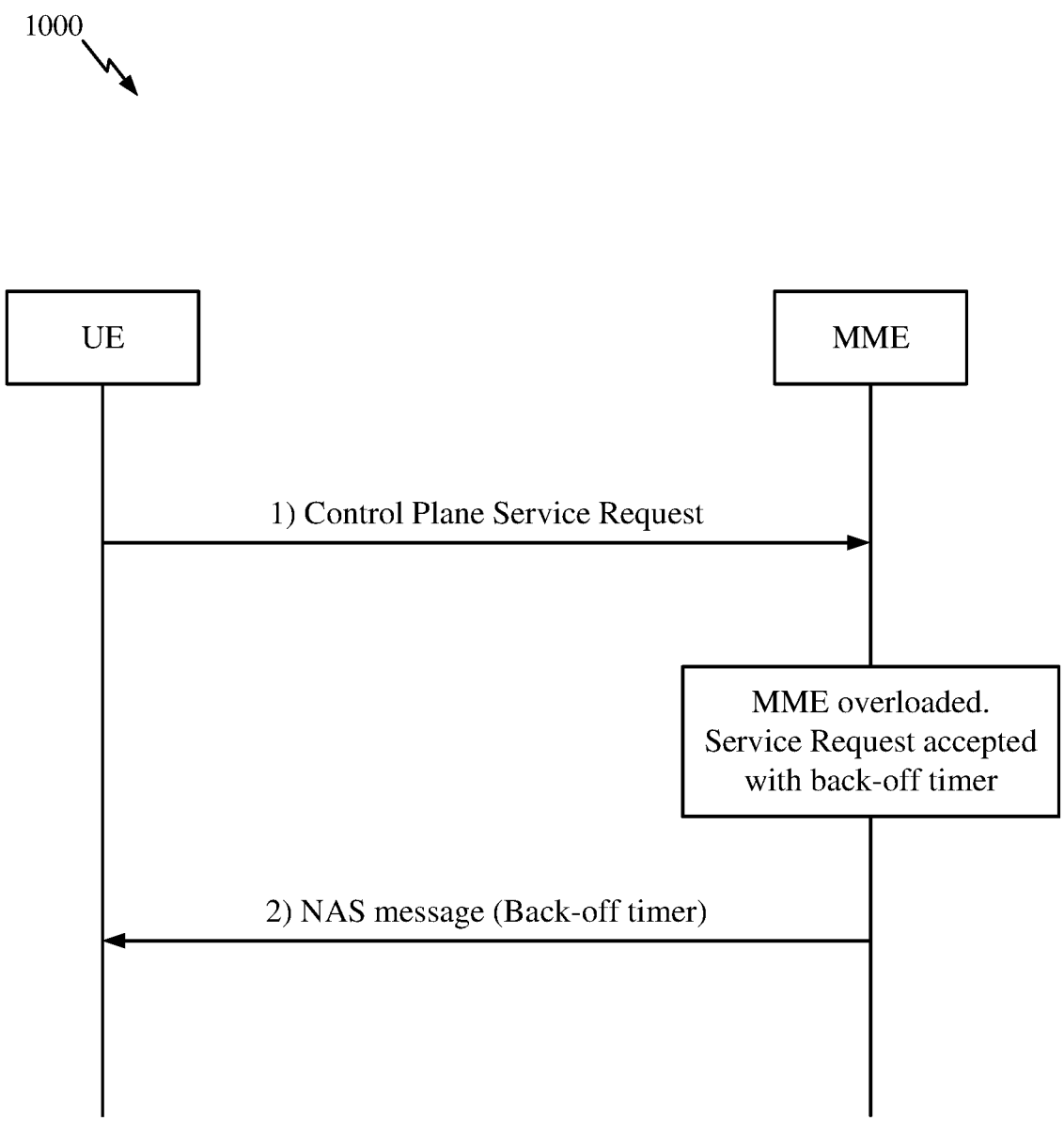
FIG. 10 illustrates operations for communicating control plane service request and control plane data back-off timer, in accordance with certain aspects of the present disclosure.

FIG. 10 illustrates operations 1000 for communicating control plane service request and control plane data back-off timer, in accordance with certain aspects of the present disclosure. At step 1, the UE initiates control plane service request from idle mode in order to transmit data (e.g., via control plane CIoT EPS optimization). If the MME is overloaded or close to overload (based on operator set threshold or policy) with data transfer via the control plane, the MME may decide to return a data back-off timer to the UE. For example, if the UE has additionally indicated in a RAI in the NAS PDU that no further UL or DL data transmissions are expected, then the MME may process (integrity check/decipher/forward) the received data packet, and send a service accept message to the UE with a back-off timer. In this case, the UE may interpret the service accept message as a successful transmission of the data packet, and start the back-off timer.

For other cases such as when the UE has indicated to the MME that further data transmission are expected, the MME may not process the received control plane data packet and may send a service reject message to the UE with a back-off timer. In this case, the UE may interpret the service reject message as an indication that the data packet transmission was unsuccessfully (e.g., was not processed by the MME). At this point, the UE may start the back-off timer. In certain aspects, the MME may take into consideration whether the PDN connection for the communication session is set to control plane only to make the decision of whether to reject the data packet and send the service reject message or move the PDN connection to a user plane and process the data packet.

In certain aspects, while the back-off timer is running, the UE may not send any NAS messages to the MME if a NAS data PDU with user data is included (i.e., data transfer via Control Plane CIoT EPS Optimization). However, there are a few exceptions. For example, if the UE is configured as a low priority device and allowed to send exception reporting, the UE may initiate control plane service request for exception reporting even if the back-off timer is running. If the UE receives a NAS message (e.g. service accept or service reject) with a back-off timer in response to exception reporting, the UE may no longer send any exception reporting while the back-off timer is running. Moreover, as presented above, if the UE receives MT data while the back-off timer is running, the UE may stop the back-off timer.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for moving, means for determining, means for monitoring, means for deferring, means for processing, means for indicating, and/or means for including, may comprise a processing system, which may include one or more processors, such as the TX processor 616, transmitter(s) 618, and/or the controller/processor 675 of the eNB 610 illustrated in FIG. 6, and/or the TX processor 668, the transmitter(s) 654, and/or the controller/processor 659 of the user equipment 650 illustrated in FIG. 6. Means for transmitting and/or means for sending may comprise a transmitter, which may include TX processor 616, transmitter(s) 618, and/or the antenna(s) 620 of the eNB 610 illustrated in FIG. 6, and/or the TX processor 668, the transmitter(s) 654, and/or the antenna(s) 652 of the user equipment 650 illustrated in FIG. 6. Means for receiving may comprise a receiver, which may include RX processor 670, receiver(s) 618, and/or the antenna(s) 620 of the eNB 610 illustrated in FIG. 6, and/or the RX processor 656, the receiver(s) 654, and/or the antenna(s) 652 of the user equipment 650 illustrated in FIG. 6.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a wireless node, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a wireless node and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a wireless node and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user-equipment (UE), comprising:
    transmitting a communication to a network node during a communication session, the communication comprising a data packet and an indication of whether the data packet is a final data packet for transmission or reception by the UE during the communication session;
    receiving a message including an indication of a back-off timer from the network node in response to the data packet;
    determining whether the data packet was processed by the network node based on whether the message comprises an accept message or a reject message, wherein whether the message comprises an accept message or a reject message is based at least on the indication of whether the data packet is the final data packet for transmission or reception by the UE during the communication session; and
    indicating to an upper layer of the UE whether the data packet was processed based on the determination.

2. The method of claim 1, further comprising moving the communication session to a user plane of the UE based on the message.

3. The method of claim 2, further comprising:
    determining to defer the moving of the communication session to the user plane if the message comprises a service accept message, wherein the service accept message indicates that the data packet was processed by the network node; and
    deferring the moving of the communication session based on the determination.

4. The method of claim 3, further comprising:
    determining that another data packet is pending for transmission to the network node, wherein deferring the moving of the communication session comprises moving the communication session upon the determination that the other data packet is pending for transmission.

5. The method of claim 1, further comprising:
    receiving a data packet from the network node while the back-off timer is running; and
    stopping the back-off timer in response to the reception of the data packet.

6. The method of claim 5, wherein the received data packet comprises a mobile terminated (MT) data packet.

7. An apparatus for wireless communication by a user equipment (UE), comprising:
    means for transmitting a communication to a network node during a communication session, the communication comprising a data packet and an indication of whether the data packet is a final data packet for transmission or reception by the UE during the communication session;
    means for receiving a message including an indication of a back-off timer from the network node in response to the data packet;
    means for determining whether the data packet was processed by the network node based on whether the message comprises an accept message or a reject message, wherein whether the message comprises an accept message or a reject message is based at least on the indication of whether the data packet is the final data packet for transmission or reception by the UE during the communication session; and
    means for indicating to an upper layer of the UE whether the data packet was processed based on the determination.

8. An apparatus for wireless communication by a user equipment (UE), comprising:
    at least one processor;
    a memory coupled to the at least one processor and storing instructions, when executed by the processor cause the apparatus to:
        transmit a communication to a network node during a communication session, the communication comprising a data packet and an indication of whether the data packet is a final data packet for transmission or reception by the UE during the communication session;
        receive a message including an indication of a back-off timer from the network node in response to the data packet;
        determine whether the data packet was processed by the network node based on whether the message comprises an accept message or a reject message, wherein whether the message comprises an accept message or a reject message is based at least on the indication of whether the data packet is the final data packet for transmission or reception by the UE during the communication session; and
        indicate to an upper layer of the UE whether the data packet was processed based on the determination.

9. The apparatus of claim 8, wherein the instructions are executable by the at least one processor to cause the apparatus to move the communication session to a user plane of the UE based on the message.

10. The apparatus of claim 9, wherein the instructions are executable by the at least one processor to cause the apparatus to:

determine to defer moving of the communication session to the user plane if the message comprises a service accept message, wherein the service accept message indicates that the data packet was processed by the network node; and defer moving of the communication session based on the determination.

11. The apparatus of claim 10, wherein the instructions are executable by the at least one processor to cause the apparatus to:

determine that another data packet is pending for transmission to the network node; and defer moving of the communication session by moving the communication session upon the determination that the other data packet is pending for transmission.

12. The apparatus of claim 8, wherein the instructions are executable by the at least one processor to cause the apparatus to:

receive a data packet from the network node while the back-off timer is running; and stop the back-off timer in response to the reception of the data packet.

13. The apparatus of claim 12, wherein the received data packet comprises a mobile terminated (MT) data packet.

14. A non-transitory computer readable medium for wireless communication by a user equipment (UE), the non-transitory computer readable medium having stored thereon program code for causing the UE to:

transmit a communication to a network node during a communication session, the communication comprising a data packet and an indication of whether the data packet is a final data packet for transmission or reception by the UE during the communication session;

receive a message including an indication of a back-off timer from the network node in response to the data packet;

determine whether the data packet was processed by the network node based on whether the message comprises an accept message or a reject message, wherein whether the message comprises an accept message or a reject message is based at least on the indication of whether the data packet is the final data packet for transmission or reception by the UE during the communication session; and indicate to an upper layer of the UE whether the data packet was processed based on the determination.

* * * * *